United States Patent [19]

Orlander et al.

[11] 4,451,221

[45] May 29, 1984

[54] APPARATUS FOR THE PELLETIZATION OF HEAT-LIQUIFIABLE SOLID MATERIALS

[75] Inventors: Michael Orlander, Dundas; Robert P. Cotsworth; Peter A. MacKenzie, both of Hamilton, all of Canada

[73] Assignee: National Slag Limited, Hamilton, Canada

[21] Appl. No.: 377,755

[22] Filed: May 13, 1982

[51] Int. Cl.³ .................................................. B22F 9/00
[52] U.S. Cl. ........................................ 425/8; 264/8; 264/9
[58] Field of Search ........................................ 425/8

[56] References Cited

U.S. PATENT DOCUMENTS 4,115,089  9/1978  Metz et al. ............................ 425/8
4,153,440  5/1979  Legille et al. ......................... 65/19

*Primary Examiner*—James R. Hall
*Attorney, Agent, or Firm*—Hirons, Rogers & Scott

[57] ABSTRACT

Apparatus for the pelletization of heat liquifiable materials, such as metallurgical slags consists of a downwardly-extending feed plate onto which the molten material is fed together with water, if required to promote the expansion of the molten material and for control of the cooling. The material discharges from the feed plate onto a rotating radially vaned drum by rotor by which it is projected into the air for simultaneous cooling and pelletization after it has first passed through a flow control gap formed between the feed plate surface and the periphery of a second rotor mounted above the feed plate. The second rotor is rotated in the direction such that it promotes the flow of the molten material down the plate, forcing the material between the vanes of the projecting rotor, while at the same time spreading the material across the width of the plate against its natural tendency to form a compact stream. The flow of the material is thereby made more uniform, providing for more effective use of the projecting rotor and avoiding localized flooding of the vanes with consequent loss of pelletization. The resulting apparatus can also be more compact for a given output. In some circumstances the second rotor can with advantage be rotated against the direction of flow down the feed plate.

8 Claims, 2 Drawing Figures

APPARATUS FOR THE PELLETIZATION OF HEAT-LIQUIFIABLE SOLID MATERIALS

FIELD OF THE INVENTION

The present invention is concerned with improvements in or relating to apparatus for the pelletization of molten heat-liquifiable solid materials, examples of which are metallurgical slags, glasses, sulphur and molten metals.

REVIEW OF THE PRIOR ART

Processes and apparatus for the pelletization of various heat-liquifiable materials, such as those mentioned above, are now well-known. A prior process and apparatus intended especially for the pelletization of metallurgical slags are disclosed in U.S. Pat. No. 3,594,142, assigned to the assignee of this application; this patent describes what is believed to be the first process by which it was possible to convert metallurgical slags consistently and economically into generally-spherical, closed-surface pellets which have a vesicular interior. The application of this prior process to the pelletization of such materials also resulted in a substantial reduction in the amount of water required for treatment of the slag, and also in the amount of noxious gaseous emissions obtained as compared with other slag handling systems employed at that time, such as pit granulation.

The pelletization apparatus employed in that prior process consists of an axially elongated cylindrical rotor that is rotated about its longitudinal cylindrical axis, which is horizontal. The rotor has around its periphery a number of radially-outwardly extending horizontal vanes and the molten slag to be pelletized, mixed with a predetermined amount of water, passes downwards under gravity over an interaction surface for a sufficient time for the slag and water mixture to reach a pyroplastic state, and then discharges onto the rotor periphery and is thrown by the vanes through the air a sufficient distance and for a sufficient time for it to cool and form self-sustaining spherical pellets. This apparatus has now been employed very successfully in a number of installations for the pelletization of many different kinds of slags.

A number of problems are encountered in practice which this basic apparatus is not able to solve expediently. For example, it is desirable for the flow of slag to be as uniform as possible, and to this end in the original process described in the prior specification the blast furnace slag was tapped into a ladle, from which it was poured into the pelletization apparatus at a controlled uniform flow rate, so as to ensure that the slag/water ratio remained within the required limits. However, it is essential for maximum economy in operation that the molten slag be fed directly by a runner from the slag-producing source, such as a furnace, to the pelletizer, and control of the flow rate is then much more difficult. Conditions at the furnace often vary during the tapping process and result in variable flow rates of molten slag.

It has been found to be advantageous for optimum operation for the vanes to be kept fully "loaded" with slag, but the loading on to any part of the rotor should not rise above a maximum value, or that part will become "flooded" and lose effectiveness.

This particular problem is rendered more acute by the difficulty found in making the flowing molten material spread out over a surface, its viscosity and surface energy being such that it tends to try to "gather" into a more compact stream that can cause the flooding mentioned above.

One prior solution to the problem is to arrange that when the flow is greater than the required maximum the surplus is diverted to a quenching pit, which is usually provided in any case as a safety feature to receive the slag directly if the pelletizing apparatus should be out of operation for any reason. This surplus is then in the less-commercially desirable air-cooled slag form. Another solution is to provide two rotors side-by-side and arrange that any flow above a predetermined maximum for the first rotor is instead fed to the second rotor, but this results in runners of objectionable length and may not always be possible in situations where the space available close to the source of the molten material is not sufficient to accommodate the larger apparatus and the larger deposit space required for the pellets.

DEFINITION OF THE INVENTION

It is therefore the principal object of the invention to provide a new pelletization apparatus able to operate successfully with a relatively wide range of rates of flow of the molten material fed thereto.

It is another object to provide such apparatus that is of relatively compact configuration to permit installation and operation thereof in a correspondingly confined space.

In accordance with the present invention there is provided apparatus for the pelletization of molten heat-liquifiable solid material comprising:

an apparatus frame, feed plate mans mounted on the frame and providing a feed surface over which the molten material flows under gravity upon being fed thereto by feeding means, a radially-vaned first projecting rotor mounted on the frame for rotation about a respective horizontal axis and on to the periphery of which the molten material is fed from the feed surface for impingement by the moving vanes and consequent projection in the form of droplets into the air for cooling and pelletization as the result of its passage through the air, a second rotor mounted on the frame for rotation about a second axis with the periphery of the second rotor spaced above the feed surface so that material flowing under gravity on the feed surface passes through a control gap formed between the feed surface and the moving periphery of the second rotor, and motor means for rotating the first rotor about its axis in the direction and at the speed for the required projection into the air for said cooling and pelletization, and for rotating the second rotor about its axis.

DESCRIPTION OF THE DRAWINGS

Apparatus which is a particular preferred embodiment of the invention will now be described, by way of example, with reference to the accompanying diagrammatic drawings wherein.

DESCRIPTION OF THE PREFERRED EMBODIMENTS

Figure 1:
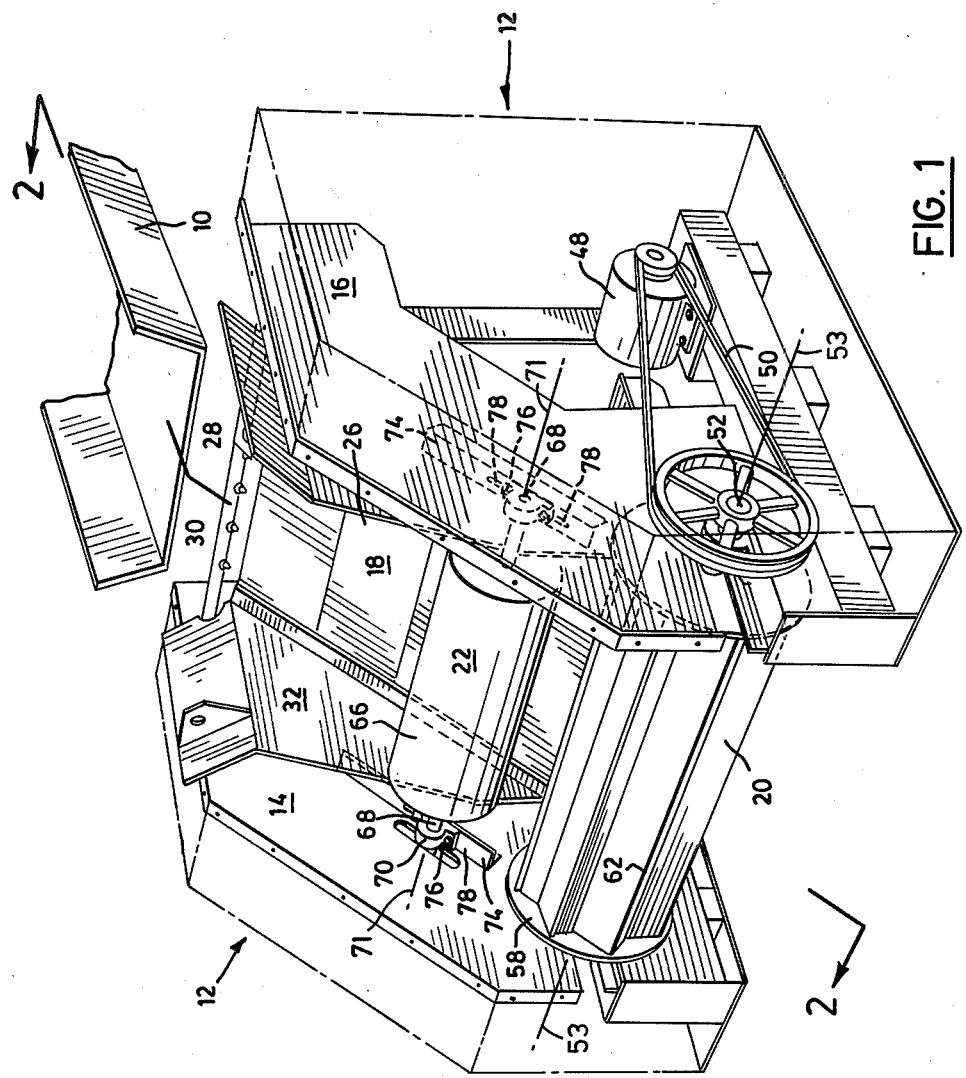
FIG. 1 is a perspective view of projection apparatus of the invention, parts thereof being shown in broken lines and in phantom, as is necessary for clarity of illustration.
Figure 2:
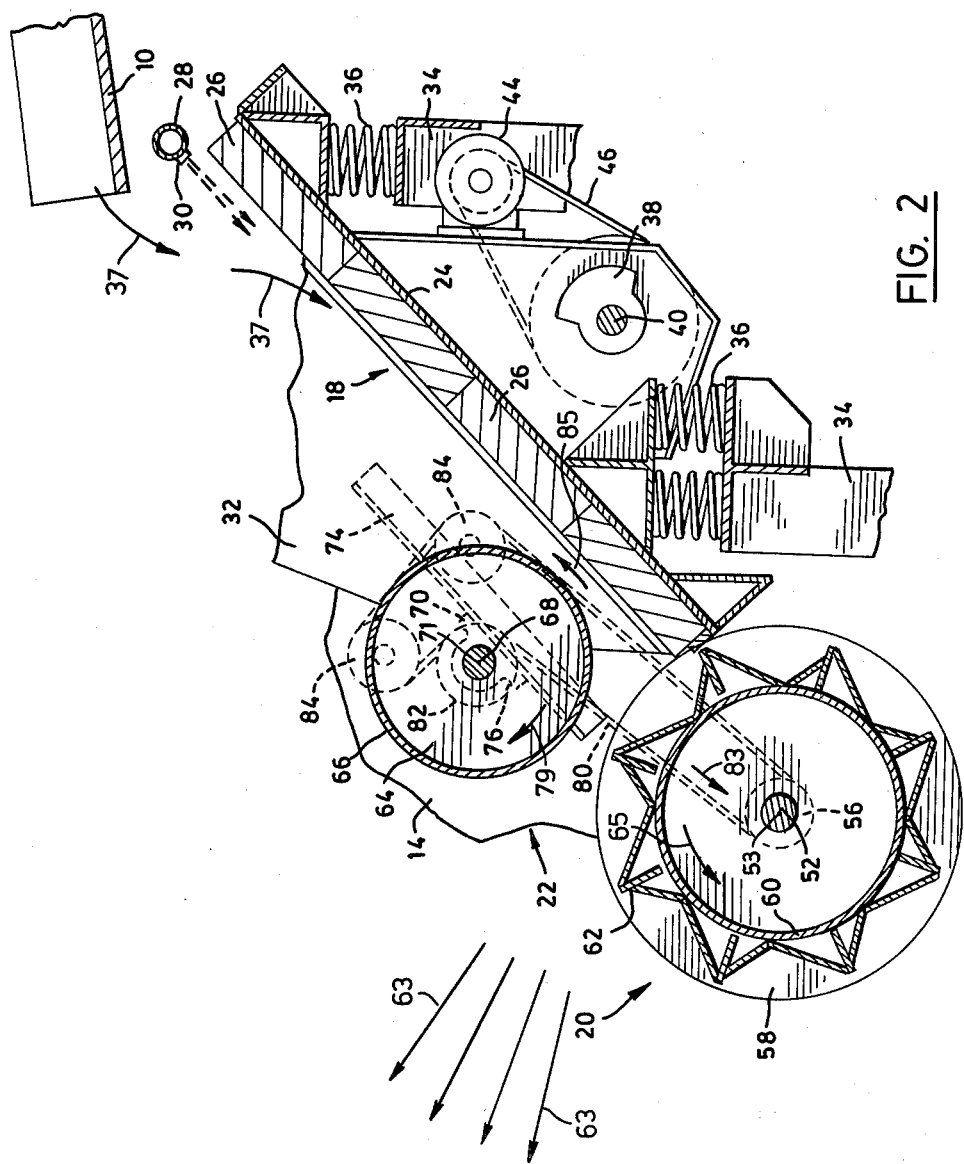
FIG. 2 is a longitudinal cross-section taken on the line 2—2 of FIG. 1.

The pelletization process is carrid out, as is now well-known and is described in our prior U.S. Pat. No. 3,594,142, by projecting the molten material into the air over a pit or other collection area from which the cooler pelletized material is removed by any conventional means, and the pelletization apparatus accordingly is mounted at the edge of the collection area and conveniently close to the source of the molten material, such as a blast furnace (not shown), from which the material is fed via a runner 10 upon tapping of the furnace.

The apparatus consists of an apparatus frame, indicated generally by the reference 12, consisting of two spaced side-frame members 14 and 16 that support between themselves the various principal operative elements of the apparatus, namely a downwardly-inclined feed plate 18, a first vaned projecting rotor 20 and a second flow-controlling rotor 22.

The feed plate consists of a flat metal base plate 24 supporting a plurality of blocks 26 of highly heat resistant material, such as graphite, the upper surfaces of which constitute the interaction feed surface over which the molten material flows under gravity while interacting with water, supplied for example from supply pipe 28 and nozzles 30, so that it will achieve the desired pelletizable state by the time that it reaches the projecting rotor 20. Sidewalls 32 are provided to confine the material flow to the feed surface, and the entire feed plate is spring-mounted on the apparatus frame and constantly vibrated to assist in preventing any adhesion of the molten material to the surface. Thus, the plate is supported from standards 34 of the frame by interposed compression coil springs 36 disposed with their compression axes vertical. A random vibration is produced by the impact of the molten slag flowing as indicated by the arrows 37 in FIG. 1 and falling from the runner 10 onto the plate, and this is superimposed upon a constant forced vibration produced by a rotating eccentric weight 38 carried by a rotatable horizontal shaft 40 mounted between downwardly-extending sidewalls 42 of the plate structure. The shaft 40 is rotated by a drive motor 44 via a belt 46. Other forms of feed plate can be employed, for example, an internally water-cooled structure, when the graphite blocks may no longer be required.

The first projecting rotor 20 consists of two spaced parallel circular side plates 58 between which extends a horizontal cylinder 60 of circular cross-section coaxial with a drive shaft 52 on which it is mounted for rotation about a horizontal axis 53, the periphery of the cylinder being provided with a number of radially-outwardly-extending throwing vanes 62 that engage the molten material discharging from the feed plate 18 at the required circumferential location to throw it into the air in the general direction of the arrows 63 for pelletization as previously described. To this end the rotor rotates anti-clockwise (arrows 65 in FIG. 1) as seen in the drawings and is driven from a motor 48 via a belt 50 and pulley 54. The rotor is cooled in operation by supplying cooling water to the interior of the drum, and also if required by spraying water on to its exterior; these and other cooling arrangements will be apparent to those skilled in the art and need not be further described.

The second rotor also consists of two spaced parallel end-plates 64 between which extends a horizontal cylinder 66 of circular cross-section coaxial with its drive shaft 68, the ends of which are mounted in respective bearing blocks 70, so that it rotates about a horizontal axis 71 parallel to and spaced from the said feed surface of the feed plate 18. The second rotor therefore presents to the molten material descending the feed plate a smooth surface that cooperates with the feed surface of the feed plate to form what may be described as a "dynamic control gap".

The blocks 70 are movably mounted on respective angle members 74 which are fixed to the side frame members 14 and 16 so as to extend parallel to the said interaction surface. Thus, as illustrated the bolts 76 holding the blocks 70 to the members 74 are movable in longitudinal slots 78 so that the position of the second rotor relative to the first rotor longitudnally of the feed plate can easily be adjusted. The height of this "dynamic gap" between the periphery of the second rotor and the said interaction surface can be adjusted most conveniently by the insertion of shims of the required thickness between the blocks and their supporting members. The rotor is rotated clockwise (arrow 79 in FIG. 1) as seen in the figures from the motor 48 and the first rotor shaft 52 via pulley 56, a belt 80, pulley 82 on the shaft 68, and idler pulleys 84, the direction of movement of belt 80 being indicated in FIG. 1 by arrow 83, so that its periphery forming the top edge of the control gap is constantly moving in the same direction as the flow of the molten material down the feed plate surface andk through the control gap.

It is also possible for the second rotor to function as a dynamic control gap if it is rotated anti-clockwise with its periphery at the gap moving against the downward flow of material (arrow 85 in FIG. 1) but there is then a greater possibility that the fast moving material will splash, which is undesirable. However, rotation in this direction introduces a shearing force opposing the flow which therefore somewhat retards the movement of the stream, giving increased time for the foaming and the possibility of producing a material of lower bulk density. The second rotor also can be cooled by the passage therethrough of cooling water supplied to its interior in any known manner.

It is found that the first projecting vane drum 20, can now be operated with increased capacity and therefor with greater efficiency and throughout of the pelletized material for a drum of given size. Thus, the control gap provided by the second rotor controls the depth of the flow of the molten material on the feed plate surface, so that the flow cannot "gather" before it reaches the projecting rotor and cause the said local over-loading and flooding of parts of the rotor periphery on which such a gathered flow would impinge. It also spreads the flowing material more evenly over the width of the feed plate and the first rotor, so that more use can be made of the end portions of the rotor, permitting maximum capacity to be achieved with a rotor of shorter given length than required hitherto. The second rotor is also believed to provide a beneficial effect in that it positively pushes the material into the inter-vane spaces for better loading thereof and greater efficiency and uniformity in the pelletization.

The thickness of the control gap will of course determine principally the maximum flow rate of the molten material at any point across the width of the feed plate and the two rotors, and should not be too small if the desired full loading of the vanes is to be obtained. The longitudinal position of the gap along the feed plate and relative to the first rotor will also require adjustment, since if it is too far back the material may have the opportunity to again gather and flood, while if it is too far forward it can interfere with the projection of the molten material, flattening its trajectory so that its time in the air is reduced and is not sufficient to cool and spherulize the material.

In a particular embodiment used for pelletizing blast furnace slags the first rotor 20 is of diameter 84 cm to the vane tips, has eight vanes and is rotated at about 250–350 r.p.m. The second rotor 22 may be of any convenient diameter and normally will be in the range from about 10 cm to about 80 cm. A drum of diameter about 60 cm preferably is rotated in the range about 25–100 r.p.m., more usually at about 50 r.p.m.. The lower speed should be such that the above-described beneficial positive push is obtained. Although in this embodiment the two rotors are driven by the same motor, in other embodiments it may be preferred to employ separate motors, the motor employed to drive the second rotor 20 being of variable speed for fine adjustment thereof.

The apparatus of the invention also permits a greater "fine tuning" of the processes for which it is employed, in that hitherto the feed rate of the molten material has been the one major parameter which as proven most difficult to control and to maintain satisfactorily uniform over the entire length of a tapping operation. The "dynamic gap" provided by the second rotor ensures that this feed rate will not increase above a predetermined rate and consequently permits more precise determination of the optimum first rotor diameter, vane number, vane configuration and vane tip speed for maximum pelletization.

The use of a rotating drum to form a "dynamic" control gap ensures that there is a minimum of adhesion of any backed-up slag to its surface, and this effect is facilitated by the forced vibration of the feed plate, since these vibrations have at least a component thereof in a direction that varies the height of the control gap, and will be transmitted to the surface of the rotating rotor through the molten material. Although a smooth-surfaced second rotor is illustrated one with shallow horizontal ridges may also be employed, such ridges acting as vestigial vanes and facilitating the hold-back of the excess material without causing projection of the material back up the feed plate.

We claim:

1. Apparatus for the pelletization of molten heat-liquifiable solid material comprising:

an apparatus frame, feed plate means mounted on the frame and providing a feed surface over which the molten material flows under gravity upon being fed thereto by feeding means, a radially-vaned first projection rotor mounted on the frame for rotation about a respective horizontal axis and on to the periphery of which the molten material is fed from the feed surface for impingement by the moving vanes and consequent projection in the form of droplets into the air for cooling and pelletization as the result of its passage through the air, a second rotor mounted on the frame for rotation about a second axis with the periphery of the second rotor spaced above the feed surface so that material flowing under gravity on the feed surface passes through a control gap formed between the feed surface and the moving periphery of the second rotor, and motor means for rotating the first rotor about its axis in the direction and at the speed for the required projection into the air for said cooling and pelletization, and for rotating the second rotor about its axis.

2. Apparatus as claimed in claim 1, wherein the second rotor is rotated about its axis in the direction such that its periphery moves in the direction of flow of the material down the feed surface and through the control gap.

3. Apparatus as claimed in claim 1 or 2, wherein the second rotor is mounted on the apparatus frame for movement parallel to the feed surface.

4. Apparatus as claimed in claim 1 or 2, wherein the second rotor is mounted on the apparatus frame to permit movement of the second rotor toward and away from the feed surface for adjustment of the height of the control gap.

5. Apparatus as claimed in claim 1, wherein the second rotor has a smooth cylindrical surface of circular cross-section coaxial with its axis of rotation.

6. Apparatus as claimed in claim 1, wherein the feed plate means is mounted by the apparatus frame for vibration having at least a component thereof in the direction for the vibration to change the height of the control gap and inhibit sticking of the molten material to the feed surface.

7. Apparatus as claimed in claim 6, wherein the feed plate means is mounted on the apparatus frame for said vibration thereof via compression springs having their compression axes vertical, and a motor-driven eccentric weight is mounted on the feed plate means to produce the vibration thereof upon rotation of the weight.

8. Apparatus as claimed in claim 1, wherein the second rotor is rotated about its axis in the direction such that its periphery moves in the direction to oppose flow of the material down the feed surface and through the control gap.

* * * * *